United States Patent [19]

Buck

[11] 4,181,744

[45] Jan. 1, 1980

[54] METHOD OF BROWNING FOODS IN A MICROWAVE OVEN

[75] Inventor: Ronald G. Buck, Burnsville, Minn.

[73] Assignee: Litton Systems, Inc., Minneapolis, Minn.

[21] Appl. No.: 829,074

[22] Filed: Aug. 30, 1977

[51] Int. Cl.² ............................ A23L 1/00; H05B 9/06
[52] U.S. Cl. .................................... 426/233; 426/523; 426/243; 219/10.55 R
[58] Field of Search ............... 426/233, 241, 243, 523; 219/10.55 A, 10.55 B, 10.55 R

[56] References Cited

U.S. PATENT DOCUMENTS

| | | | |
|---|---|---|---|
| 3,467,804 | 9/1969 | Smith | 219/10.55 B |
| 3,839,616 | 10/1974 | Risman | 219/10.55 R |

OTHER PUBLICATIONS

Schmidt, A. X., "Material and Energy Balances," Prentice-Hall Inc., N.J., 1962, pp. 61-65.

*Primary Examiner*—Robert A. Yoncoskie
*Attorney, Agent, or Firm*—Robert E. Lowe

[57] ABSTRACT

A method for effectively browning foods in a microwave oven by controlling the humidity of the cooking environment. Humidity and temperature sensors are provided to measure the relative humidity of the environment surrounding a foodstuff to be browned as the food is cooked by microwave energy. The actual sensed conditions are compared with a predetermined optimum relative humidity. Adjustments to the relative humidity are then made by either increasing or decreasing the air exchange rate, or by increasing or decreasing the amount of heat added to the air exchanged, or both.

9 Claims, 1 Drawing Figure

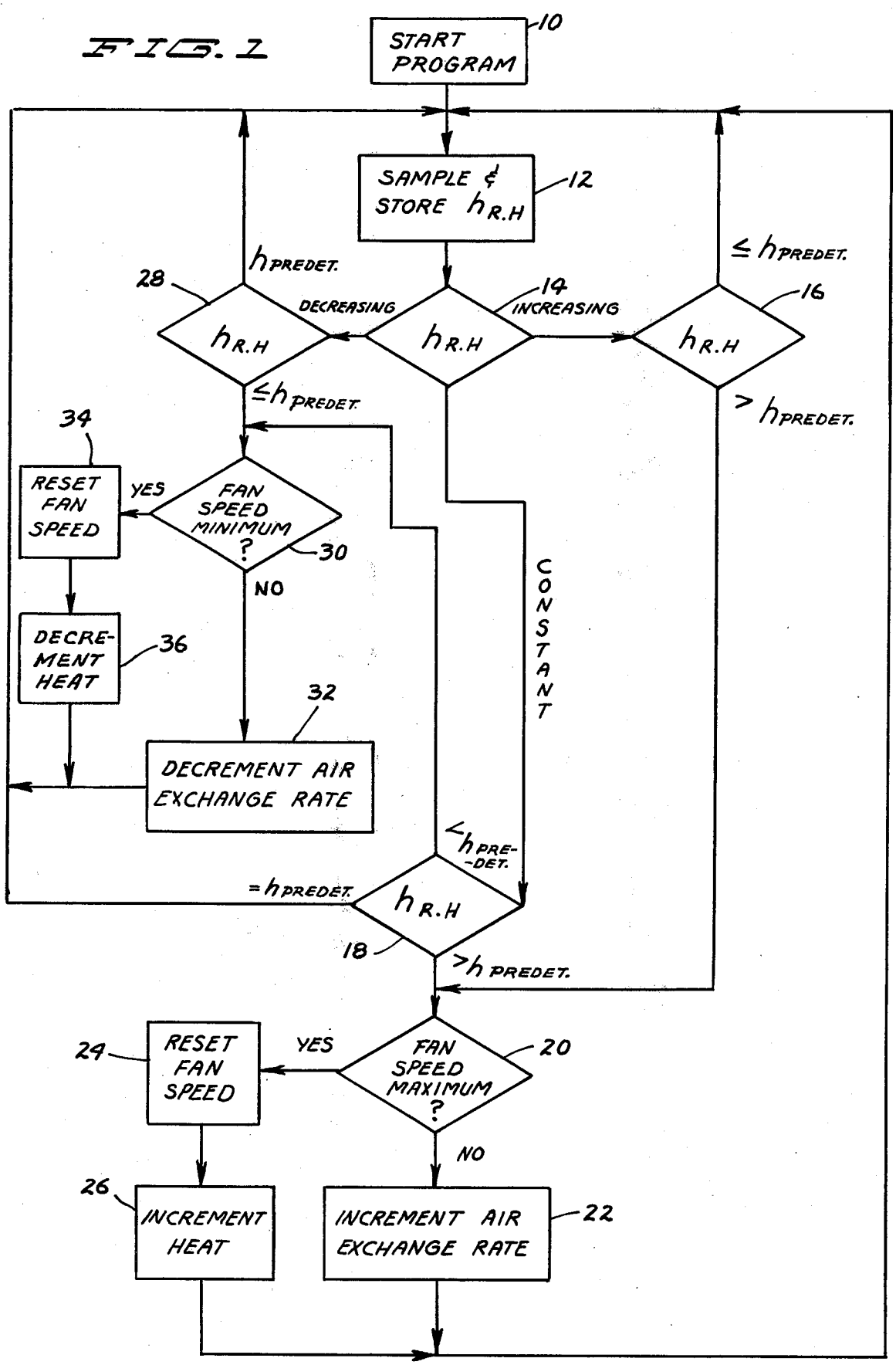

METHOD OF BROWNING FOODS IN A MICROWAVE OVEN

BACKGROUND OF THE INVENTION

1. Field of the Invention

The present invention relates generally to improvements in a method for microwave cooking, and more particularly, pertains to a new and improved method for browning in a microwave oven wherein the relative humidity is strictly controlled within the environment of the microwave heating cavity for browning of a particular food.

2. Description of the Prior Art

In the field of microwave ovens, it has been a general practice to employ non-microwave techniques to achieve the browning of foods in microwave oven heating cavities. Such prior art devices have been unsatisfactory in defeating the main purpose of "cool" microwave heating energy by having a higher cooking temperature within the microwave heating cavity to brown foods in addition to requiring extra energy to accomplish the browning of foods.

There are many techniques currently utilized in the marketplace to accomplish browning of foods in the microwave heating cavity. One such prior art device is the resistance heater, commonly known in the art as the Calrod, which is energized in combination with or in addition to the microwave heating. The resistance heater internal to the microwave oven heating cavity presents a higher temperature within the microwave oven heating cavity, consumes a generous quantity of electrical power, and presents a certain safety hazard to one reaching inside the microwave oven heating cavity when the resistance heating rod has not yet cooled down. Another type of prior art technique used in browning is preheating the air prior to the introduction of the preheated air through the entrance ventilation port of the microwave oven heating cavity. This preheating of the air requires additional heating structure external to the microwave oven heating cavity in addition to consuming amounts of electrical power. An additional type of prior art heating device is the browning dish which has a chemical composition that is excited and generates heat upon irradiation by microwave energy. These dishes are somewhat unsatisfactory in that they maintain a certain temperature above that of the microwave oven heating cavity in addition to requiring one to turn the foodstuffs, stir the foodstuffs, or cover the foodstuffs with the use of the browning dish. All of the above techniques are unsatisfactory in that an additional device is required to further brown the foodstuffs in addition to the heating performed by the microwave energy. These devices obviate the primary advantage of "coolness" of microwave energy in microwave cooking of food in the microwave oven cooking cavity.

This invention, a method of browning in a microwave oven, overcomes the disadvantages of the prior art by providing a method of browning in a microwave oven heating cavity by maintaining the relative humidity at a predetermined set value.

SUMMARY OF THE INVENTION

The present invention obviates the foregoing disadvantages of the prior art by providing a method of browning in a microwave oven heating cavity by maintaining a predetermined relative humidity in the microwave oven heating cavity for a particular type of food.

According to the preferred embodiment of the present invention, there is provided a method of browning in a microwave oven heating cavity comprising the steps of continuously sampling and storing the time dependent "in-situ" relative humidity; comparing the sampled relative humidity against a predetermined relative humidity; if the sampled relative humidity is increasing and is less than or equal to the predetermined relative humidity value, then no action is taken; if it is greater than the predetermined relative humidity, then adjustments are made in the fan speed, the air exchange rate, or preheating of the air introduced into the microwave oven heating cavity; and if the relative humidity is decreasing from the predetermined relative humidity, then action is taken to decrement the air exchange rate, decrement the heat, or reset the fan speed. The humidity is sensed by a humidity sensor positioned to sense the time dependent "in-situ" environmental relative humidity condition of the microwave oven heating cavity giving an "in-situ" sensing of the microwave oven heating cavity.

A significant aspect and feature of the present invention is the ability to brown foods being cooked in a microwave oven heating cavity by maintaining a predetermined relative humidity in the microwave oven heating cavity.

Another significant aspect and feature of the present invention is that by maintaining the predetermined relative humidity constant in the microwave oven heating cavity, the browning will carry through to the underside of the surface and brown the entire food being heated within the cavity, such as a piece of meat.

Having briefly described the embodiment of the present invention, it is a principal object to provide a new and improved method for browning in a microwave oven.

An object of the present invention is to provide a method for continuously sampling and storing the time dependent "in-situ" relative humidity with relation to a predetermined relative humidity. The term "in-situ" as used in this application is defined as the actual time dependent environmental conditions which exist in the environment surrounding the food product which is located in and cooked in the microwave oven heating cavity. Although in the present invention, a humidity sensor and a temperature sensor may be positioned outside of the microwave oven heating cavity, the sensors are configured to sense the "in-situ" environmental conditions of the microwave oven heating cavity and provide "in-situ" signal information of the environmental conditions of the microwave oven heating cavity to a programmable controller controlling the microwave oven. If the sensed relative humidity is increasing and is less than or equal to the predetermined relative humidity, then no action is taken and sampling is continued. Similarly, no action is taken and sampling continues if the sensed relative humidity is greater than the predetermined relative humidity and is decreasing. However, in those cases where the humidity is greater or less than the predetermined ideal humidity and is not changing toward that predetermined ideal, then it is necessary to make adjustments in the fan speed, the air exchange rate, or the heat rate of air being introduced into the interior of the microwave oven heating cavity through the entrance ventilation port.

Another object of the invention is to provide for the browning of foods on a top surface which carries through to the underside surface of the food permitting cool cooking with the microwave energy.

BRIEF DESCRIPTION OF THE DRAWINGS

Other objects and many of the attendant advantages of this invention will be readily appreciated as the same becomes better understood by reference to the following detailed description when considered in connection with the accompanying drawing, in which like reference numerals designate like elements throughout the figure thereof and wherein:

FIG. 1 illustrates a flow chart of the steps for the method of browning in a microwave oven.

DESCRIPTION OF THE PREFERRED EMBODIMENT

FIG. 1 illustrates a flow chart of the steps for a method of browning in a microwave oven in accordance with the present invention. The method is commenced by start program 10 and then sampling and storing the time dependent "in-situ" relative humidity 12 of a microwave oven heating cavity of a microwave oven. If the relative humidity 14 is increasing but less than or equal to a predetermined relative humidity 16, then no action is taken and sampling and storing of the relative humidity 12 is continued. If the relative humidity 14 is constant and equal to the predetermined relative humidity 18, then again no action is taken and sampling and storing the relative humidity 12 is continued. If the sampled and stored relative humidity 12 is increasing and greater than the predetermined relative humidity value 16, then the fan conditions 20 is checked for maximum speed. If the fan speed 20 is not maximum, a NO condition, then the air exchange rate 22 is incremented. If the fan speed 20 is maximum, a YES condition, then the fan speed 24 is reset and the heat 26 is incremented for the air being introduced at an entrance ventilation port of the microwave oven heating cavity. If the relative humidity 14 is decreasing and is less than or equal to the predetermined relative humidity 28, then the fan speed 30 is checked for minimum. If the fan speed 30 is not minimum, a NO condition, then the air exchange rate 22 is decremented, and sampling of the relative humidity 12 continues. If the fan speed 30 is minimum, a YES condition, then the fan speed 34 is reset and the heat of the air being introduced at the entrance ventilation port of the microwave oven heating cavity is decremented 36. If the sampled and sensed humidity 14 is constant, but less than the predetermined relative humidity 18, then the fan speed 30 is checked for a minimum condition.

PREFERRED MODE OF OPERATION

Relative humidity in air results from the partial vapor pressure at the food surface equalizing with the partial vapor pressure of the air in the microwave oven heating cavity during microwave cooking. Browning reactions are usually slow at low humidities and increase to a maximum in the range of intermediate moisture. Beyond the range of intermediate moisture, the browning reactions decrease. The basic premise of browning in a microwave oven is to maintain the predetermined relative humidity in the intermediate moisture range.

The controlling of the humidity for browning of food such as cookies, cakes, pastries, pizza, french fries, etc. is particularly beneficial during the heating of the foods with microwave energy. This method around the basic premise of sampling and storing the relative humidity and checking to see whether the sampled relative humidity is constant, increasing or decreasing from the predetermined relative humidity.

The method is implemented in accordance with the flow chart of FIG. 1 as an algorithm stored in a programmable controller such as an Intel 8080 Microprocessor. The algorithm of FIG. 1 maintains the predetermined relative humidity in the microwave oven heating cavity.

An aluminum oxide humidity sensor, such as a Thunder Scientific TC-2000 Humidity Measurement Module, is positioned adjacent to and by the exit ventilation port to the exterior side of the microwave oven heating cavity for way of example and for purposes of illustration only, to sense the time dependent "in-situ" environmental conditions internal to the microwave oven heating cavity. The sensor is positioned to sense the time dependent "in-situ" environmental conditions of the microwave oven heating cavity and is electromagnetically isolated from the microwave oven heating cavity. The humidity sensor connected to the programmable controller having the steps of the algorithm of FIG. 1 stored in the memory of the programmable controller. The programmable controller connects to the microwave power source power supply and the air exchange fan speed and heating circuits.

If the sampled time dependent "in-situ" relative humidity is increasing and is less than or equal to the predetermined relative humidity, then no action is needed, and sampling and storing of the relative humidity 12 is continued.

If the sampled relative humidity is constant and greater than the predetermined relative humidity or increasing and is greater than the predetermined relative humidity, then it is necessary to decrease the relative humidity within the microwave oven heating cavity. First, the fan speed pushing air through the microwave oven heating cavity is checked to see if a maximum condition 20 is satisfied. If it is not, then the speed of the fan is increased to increment the air exchange rate 22. If the fan is at maximum speed, then the fan speed is reset 24 and the air being introduced into the microwave oven heating cavity heat is incremented 26 by such devices as a resistance heater, an infrared lamp, or a Calrod. If the humidity continues to increase, then the fan speed 24 is increased to increment the air exchange rate 26 to bring the relative humidity of the microwave oven heating cavity value in line with the predetermined relative humidity value.

If the sampled relative humidity decreases from the predetermined relative humidity and it is less than or equal to the predetermined relative humidity, it is necessary to increase the relative humidity in the microwave oven heating cavity. If the fan speed minimum condition 30 is not satisfied, then the air exchange rate 32 is decremented. If the fan speed is minimum 34, then the heat being introduced into the microwave oven heating cavity is decremented 36.

By maintaining the proper desired relative humidity in the interior of the microwave oven heating cavity which is sensed "in-situ" for the microwave oven heating cavity, browning of the food occurs no matter what the doneness of the food. An operator of the oven only needs to know the predetermined relative humidity required to brown a particular type of food and by maintaining the predetermined relative humidity, browning occurs which carries through to the underside surface of the food such as meat.

Various modifications may be contemplated for the method of browning foods in a microwave oven.

Having thus described the invention, there is claimed as new and desired to be secured by Letters Patent:

1. A method for imparting a browned appearance to the surface of food in a microwave oven having air circulation wherein said food is placed in a microwave oven and subjected to microwave energy to cook said food, the method comprising the steps of:
   (a) positioning a humidity sensor to measure the humidity in the microwave oven, said sensor providing a signal indicative of said humidity to a programmable controller;
   (b) comparing said measured humidity with a predetermined humidity value selected for the food being browned and stored in said programmable controller;
   (c) adjusting the humidity in said oven toward said predetermined humidity value to provide optimum humidity conditions for surface browning of the food;
   (d) repeating steps (a) to (c) on a continuing basis as the food is cooked.

2. The method of claim 1 wherein the microwave oven humidity is adjusted by either increasing or decreasing an air exchange rate in said oven.

3. The method of claim 1 wherein the microwave oven humidity is adjusted by either increasing or decreasing the amount of heat added to the air circulated into said oven prior to introduction of said air into the oven cooking cavity.

4. The method of claim 2 wherein when the measured relative humidity is greater than said predetermined humidity value the air exchange rate in said oven is increased.

5. The method of claim 2 wherein when the measured relative humidity is less than said predetermined humidity value the air exchange rate in said oven is decreased.

6. The method of claim 4 including the step of adding heat to the air exchanged in said oven.

7. The method of claim 5 including the step of reducing the heat added to the air exchanged in said oven.

8. In a method for microwave cooking of food wherein a browned surface appearance is desired including the steps of placing said food in a microwave oven having air circulation and provided with a humidity sensor and exposing said food to microwave energy of an intensity sufficient for cooking, the improvement comprising:
   continually monitoring the relative humidity in the oven and adjusting an oven air exchange rate to alter said relative humidity toward a predetermined relative humidity selected for the food being browned, whereby a relative humidity condition optimum for browning is maintained in said oven.

9. The method of claim 8 wherein said predetermined relative humidity is stored in a programmable controller and wherein said controller receives inputs indicative of the oven relative humidity and generates output signals to adjust said air exchange rate.

* * * * *